United States Patent
Howard et al.

(10) Patent No.: US 7,805,395 B2
(45) Date of Patent: Sep. 28, 2010

(54) SYSTEM AND METHOD FOR AUTOMATED POPULATION SPLITTING TO ASSIST TASK MANAGEMENT THROUGH ANALYTICS

(75) Inventors: Mike Howard, Austin, TX (US); Boryana Dimova, Austin, TX (US)

(73) Assignee: Austin Logistics Incorporated, Austin, TX (US)

( * ) Notice: Subject to any disclaimer, the term of this patent is extended or adjusted under 35 U.S.C. 154(b) by 705 days.

(21) Appl. No.: 11/736,065

(22) Filed: Apr. 17, 2007

(65) Prior Publication Data

US 2008/0262804 A1    Oct. 23, 2008

(51) Int. Cl.
*G06F 17/00*    (2006.01)
*G06N 5/02*    (2006.01)
(52) U.S. Cl. ....................................... 706/50
(58) Field of Classification Search .............. 706/50
See application file for complete search history.

(56) References Cited

U.S. PATENT DOCUMENTS 7,610,257 B1 * 10/2009 Abrahams .................... 706/62

2005/0002515 A1 * 1/2005 Mewhinney et al. ... 379/266.08

* cited by examiner

*Primary Examiner*—Donald Sparks
*Assistant Examiner*—Li-Wu Chang
(74) *Attorney, Agent, or Firm*—Hamitlon & Terrile, LLP; Robert W. Holland

(57) ABSTRACT

Task management supported by analytics has enhanced effectiveness through automated population splitting for generating models that predict task associated outcomes. Subpopulations are automatically analyzed for adequate sample size and selectively recombined based on characteristics of the subpopulations, such as to combine homogeneous subpopulations or to optimize a subpopulation characteristic. As an example, outbound calling campaign models are generated for time periods by splitting a sample population into time period subpopulations and combining subpopulation time periods having inadequate sample size so that combined subpopulations have a minimized total time period or greater similarity relative to other subpopulations.

2 Claims, 5 Drawing Sheets

SYSTEM AND METHOD FOR AUTOMATED POPULATION SPLITTING TO ASSIST TASK MANAGEMENT THROUGH ANALYTICS

BACKGROUND OF THE INVENTION

1. Field of the Invention

The present invention relates in general to the field of task management support through analytics, and more particularly to a system and method for automated population splitting to assist task management through analytics.

2. Description of the Related Art

Analytics are often used to aid management of a variety of tasks. Generally, analytics use historical information to generate models that predict future outcomes. For example, linear and logistic regression analytical techniques apply selected independent variables to generate models that predict dependent variable outcomes based on the historical relationship of the independent and dependent variables. Such models are commonly used to predict outcomes for the extension of credit, such as mortgages, credit cards and auto loans. One common measure of an individual's creditworthiness is a credit score that compares the individual's financial characteristics with the characteristics of a modeled population. Generally, the more that the population and individual characteristics share in common with each other, the greater the predictive quality of a score for the individual that is generated from a model of the population. In order to obtain credit scores with adequate predictive quality, financial institutions tend to attempt to generate models from large populations. The predictive quality of models is usually estimated by a variety of techniques that consider population size and other factors.

The availability of powerful computers to process large sets of data has expanded the use of analytics for task management not only in the types of tasks that are managed, but also the frequency with which analytics are performed to obtain models that are current and accurate. One example is the use of analytics to predict whether a desired person will answer a telephone call to a telephone number, as described in U.S. Pat. No. 5,802,161 System and Method for Optimized Scheduling. Basically, a model predicts the likelihood that a right person will answer a telephone call during defined periods of a day and the predicted likelihoods are optimized so that the number of right person contacts is increased compared with random call placement. In some instances, models are applied based on hourly calling periods defined through a day. Optimized dependent variables include the maximum number of right party contacts, the maximum amount of revenue generated by the calls, the maximum number of cured accounts, the minimum number of canceled accounts, etc . . . As contacts are made and accounts are handled, updated results allow additional modeling so that future contact attempts benefit from the application of the existing results.

One technique that helps to develop more accurate statistical predictive models through linear regression, logistic regression and other modeling techniques is to split the modeling population into relatively homogeneous subpopulations. Developing separate models for each of these subpopulations helps to maximize both the total amount of predictive power of the overall scoring system and the goodness of fit and validation of the subpopulation models. As a simple example, a subpopulation that has high-value mortgages often has a higher correlation for a selected dependent variable, such as likelihood of repaying credit or likelihood of answering a call at a defined time, with a given set of independent variables than does a population that includes individuals with sub-prime mortgages. During preparation of custom models, the number of subpopulations considered is typically limited due to the labor costs associated with developing and validating each model. For example, where a large number of variables are available, a skilled statistician might select certain variables to consider as subpopulations in a recursive manner, such as with the Classification and Regression Tree (CART) method. A binary tree of subpopulations is defined recursively with each node split into two sub-nodes and the splitting variable selected to establish sub-populations that are as homogeneous as possible in terms of the behavior of the regression response variable. Such selection of splitting variables and validation of models based on subpopulations is a labor-intensive, manual process typically performed by a skilled statistician that generally cannot be reliably automated. As an example, a natural hierarchy sometimes exists for the order in which splitting variables are used that is not amenable to automation. For instance, splitting populations based on types of loans before the amount of each loan naturally provides more homogeneous populations since different types of loans have different typical balance levels. As another example, splits into more than two nodes are sometimes desired or required.

SUMMARY OF THE INVENTION

Therefore a need has arisen for a system and method which automatically splits populations to better define models for analytically managing tasks.

In accordance with the present invention, a system and method are provided which substantially reduce the disadvantages and problems associated with previous methods and systems for applying analytics to manage tasks. A sample population is split into plural subpopulations with each subpopulation supporting generation of a model to manage a task by predicting outcomes of the task. Subpopulations are analyzed to determine if their samples are adequate to support generation of a model, and are selectively combined when a subpopulation is determined inadequate to support a valid model.

In one specific area of application, outbound contact task management is enhanced with analytics that predict outbound contact outcomes during a daily campaign. After the population splitting process is completed and the final subpopulations are chosen, each final subpopulation is further split into hourly time periods covering the duration of the daily campaign. These hourly time periods are combined into longer time periods as needed, per subpopulation, to obtain adequate samples for creating models having valid predictive qualities for each of the defined time periods. For example, the choice of how to combine time periods can be made by seeking to optimize a specific parameter, such as minimizing the length of the longest time period obtained after the combination of hourly time periods to provide adequate samples. As another example, a second level of choice seeks to combine hourly time periods in a manner which results in maximizing behavior homogeneity within each of the resultant longer time periods.

The present invention provides a number of important technical advantages. One example of an important technical advantage is that automated population splits support improved task management by creation of more accurate predictive models based on homogeneous subpopulations. The automated population splits are performed with consideration to any natural hierarchy of the splitting variables and with more than two nodes defined in each split. Automation of the splitting process reduces the level of skill needed for a statistician to define subpopulations for optimal modeling, thus reducing the cost and labor associated with analytics-based task management. In one embodiment, outbound call tasks are managed with optimal time period definitions uniquely determined for each terminal subpopulation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Task management supported by analytics provides timely and efficient use of resources by allocating resources according to predicted task outcomes. Optimization based upon models that accurately predict task outcomes helps to ensure that resources are put to their most effective use in accomplishing optimized goals. The accuracy of models increases where in-depth and relevant historical data are applied as independent variables to predict dependent variables for optimization. Generally, model development based on samples from a population whose independent variables behave in a consistent and homogeneous manner throughout that population will provide better fitting models having more accurate predictive qualities. Properly splitting a population into subpopulations can provide more homogeneous samples for modeling within each subpopulation, resulting in more accurate predictions and thus better task management. However, the binary tree approach usually applied by statisticians tends to add complexity and offers limited use of the natural hierarchy for use of splitting variables often available in sample data. Multiple branch approaches such as CHAID employ a primitive tree pruning approach which artificially prevents the full decomposition of the population in a manner which allows the fullest extraction of information from the available data.

Figure 1:
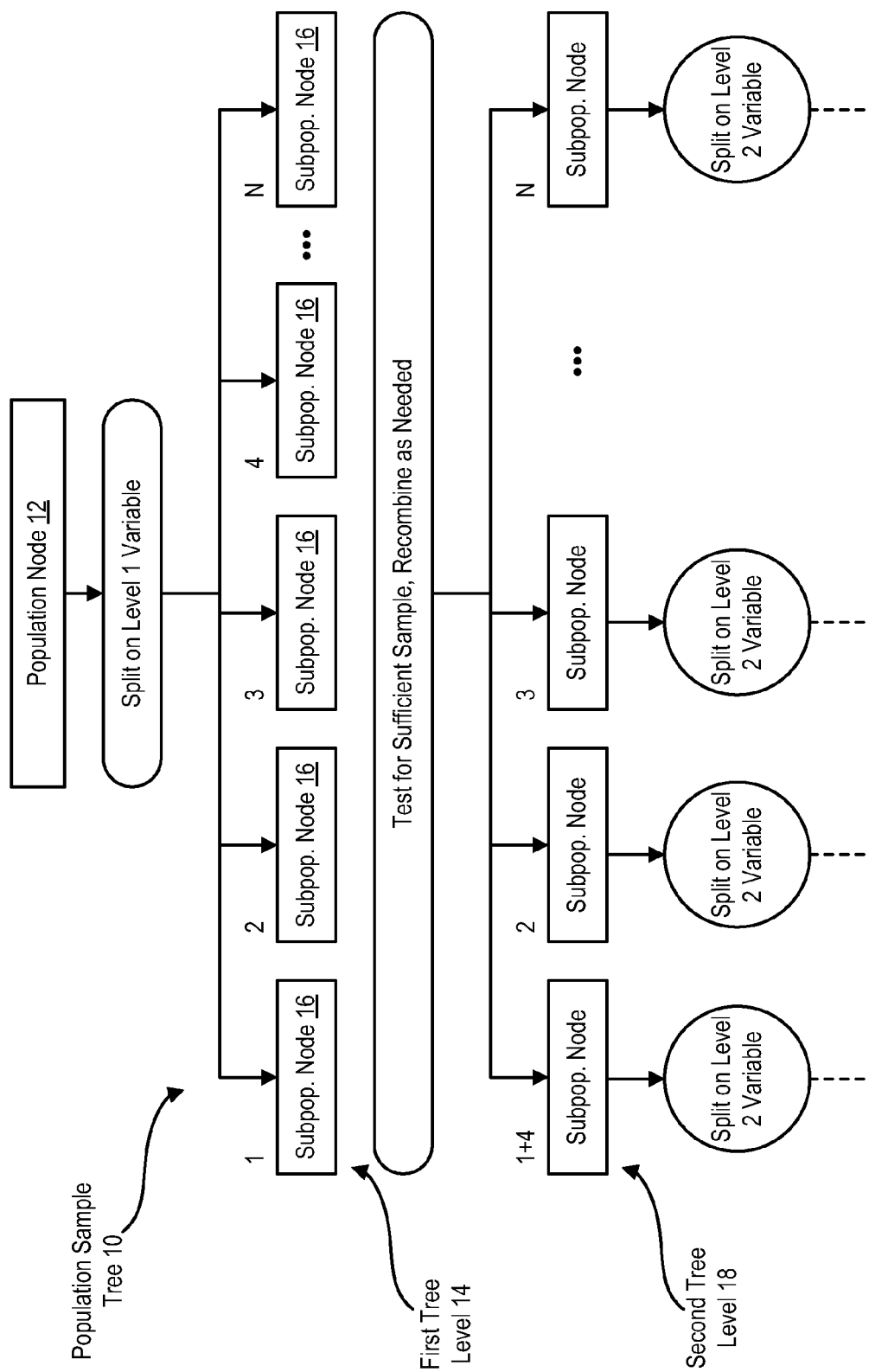
FIG. 1 depicts a logical tree showing splits of a population into subpopulations and combination of subpopulations where a subpopulation provides an inadequate sample for creating a valid model to use in managing a task by predicting outcomes associated with the subpopulation.

Referring now to FIG. 1, a logical tree depicts splits of a population into subpopulations, and combination of some subpopulations where one or more subpopulations has an sample inadequate to support development of a valid model to use in managing a task by predicting outcomes associated with the subpopulation. Population sample tree 10 has a primary population node 12 that includes a data set draw from the total population for use in generating models. For example, population node 12 contains historical results of call attempts to delinquent accounts having associated account information so that models based on population node 12 will accept current account information to predict call attempt results for the current accounts. Population node 12 is split at a first tree level 14 into a plurality of subpopulation nodes 16 based on a selected splitting variable. Using the example of historical call attempts for delinquent accounts, the first level splitting variable could be days delinquent, defining a subpopulation node 16 based on a predetermined range of number of days delinquent (see the Table below). Once subpopulation nodes 16 are defined based upon the selected splitting variable, each subpopulation node is tested to determine whether it will support development of a valid model and, if not, selected subpopulation nodes 16 are recombined so that each remaining subpopulation node has a sample adequate for model development. The remaining subpopulation nodes 16 may then be further split at a second tree level 18 based on another splitting variable, and the process is continued.

Figure 2:
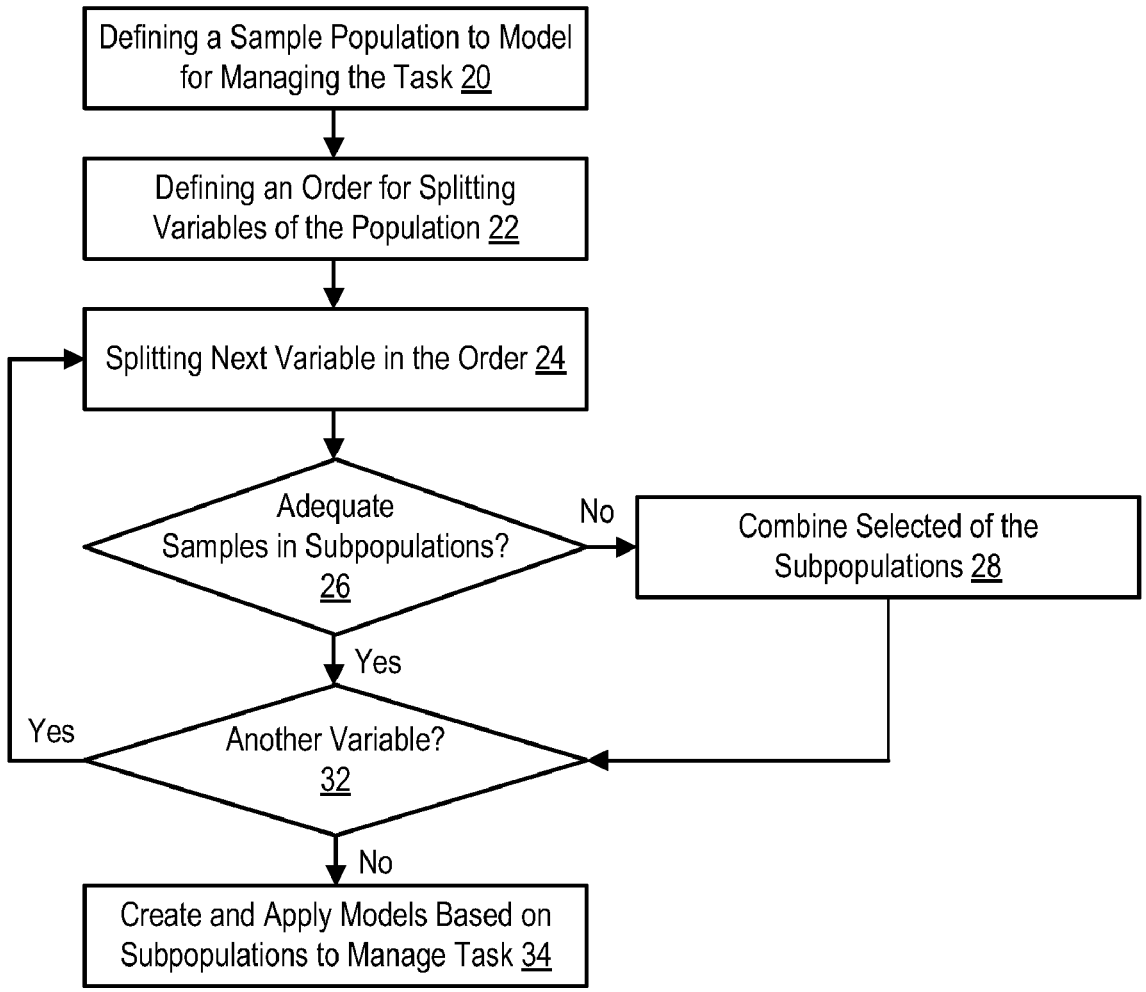
FIG. 2 depicts a flow diagram of a process for splitting a population into subpopulations and recombining selected subpopulations having inadequate characteristics to create remaining subpopulations that have adequate characteristics.

Referring now to FIG. 2, a flow diagram depicts a process for splitting a population sample into subpopulations samples, and recombining selected subpopulations whose samples are inadequate to create a reduced set of subpopulations which all have adequate samples. The process begins at step 20 with the defining of a sample population to model for managing a desired task and continues to step 22 with the defining of an order for splitting variables of the population. As an example of a population used to manage tasks related to consumer behavior, the following table presents a plurality of variables listed in an order for splitting with proposed splitting values for each variable:

| | Splitting Levels and Splitting Variables Example | |
|---|---|---|
| Splitting Level | Splitting Variable | Typical Values |
| 1 | Delinquency Level | "$\geq$30 but <60", "$\geq$60 but <90", "$\geq$90" |
| 2 | History Indicator | "History", "No History" |
| 3 | Trade Class | "Business Secured", "Business Unsecured", "Consumer Secured", "Consumer Unsecured" |
| 4 | Trade Type | "Mortgage", "Home Equity", "Line of Credit", "Credit Card", "Overdraft Protected Checking", "Signature Loan", "Auto Loan", "Recreational Equipment Loan", "Federally Backed Student Loan" |
| 5 | Mortgage Class | "Prime", "Sub-prime", "Does Not Apply" |

-continued

Splitting Levels and Splitting Variables Example

| Splitting Level | Splitting Variable | Typical Values |
|---|---|---|
| 6 | Home Equity Class | "Prime", "Sub-prime", "Does Not Apply" |
| 7 | Credit Card Class | "Prime", "Sub-prime", "Co-branded", "Does Not Apply" |
| 8 | Auto Loan Class | "Prime", "Sub-prime", "Does Not Apply" |
| 9 | Amount Late - Mortgage | "Low", "Medium", "High", "Does Not Apply" |
| 10 | Amount Late - Home Equity | "Low", "Medium", "High", "Does Not Apply" |
| 11 | Amount Late - Credit Card | "Low", "Medium", "High", "Does Not Apply" |
| 12 | Amount Late - Auto Loan | "Low", "Medium", "High", "Does Not Apply" |

In the present example, numerical values are converted to character values by replacing defined numerical ranges with characters, such as specific value range indicators like "$\geq 30$ but <60", "$\geq 60$ but <90", "$\geq 90$", or low, medium and high. Each level of the population sample tree has one splitting variable listed in order from one to twelve. Where a splitting variable does not provide meaningful information for some branches defined at that level, a character representing "does not apply" is assigned and that portion of the branch is not split to pass unchanged to the next level. If a "does not apply" value applies to any portion of a given branch subpopulation at a given level, it applies to the entire branch. The splitting variable order may follow a natural hierarchy or may be changed around to achieve a desired result. As an example of a natural hierarchy, the existence and type of a loan is typically considered as a splitting variable before the amount of a loan.

At step 24, the next variable in the splitting order is split at the defined splitting values. For example, from table 1, the delinquency level is split first at the three defined levels, then the history indicator and so through the ordered list of twelve variables. At step 26, a determination is made of whether the sample of each subpopulation is adequate. The sampling criteria depend upon the nature of the models to be developed from the subpopulations. For example, a linear regression model simply needs a large enough number of observations to meet desired large sample statistics criteria. Models such as logistical regression having a binary response variable need an adequate number of observations in each performance group. For N-ary response variables of N performance groups:

$m(i)$=number of observations in the sample which are in the i-th group

L=smallest allowable size for each $m(i)$, i=1, . . . ,N then the adequate sample requirement is $L \leq \text{minimum}[m(1), m(2), \ldots, m(N)]$ Generally, it is useful to define a sample adequacy measure for each particular definition of an adequate sample so that a normalized measure supports automation of the splitting process. For example, a normalized measure of one or greater indicates an adequate sample while a normalized measure of less than one indicates an inadequate sample. For a continuous response variable with a minimum sample size of L observations, the sample adequacy measure is:

M(sample)=m/L, where m is the size of the sample in question

For an N-ary response variable using the notation above, $M(\text{sample}) = \{\text{minimum}[m(1), m(2), \ldots, m(N)]\}/L$ In one embodiment, a population having a history of outbound contact attempts to accounts during a campaign day is used to predict results of future contact attempts. The population is split into subpopulations to develop models and each subpopulation sample is then split into sixteen hourly time periods to build models that better manage contact attempts with current accounts during a campaign day. In order to obtain samples adequate for model development, it can be necessary to combine some of the contiguous hourly time periods into longer modeling time periods. The contact attempt models are ternary, meaning 3-ary having three performance groups, with a right party contact group, a wrong party contact group and a non-contact group. The adequate sample criterion for a single modeling time period is:

$L \leq \text{minimum}[m(1), m(2), m(3)]$

The quantities in [0029] are defined by

Performance group 1=Right party contact

Performance group 2=Wrong party contact

Performance group 3=Non-contact $m(i)$=number of observations in the sample which are in the i-th group L=smallest allowable size for each $m(i)$, i=1,2,3

To avoid diluting the predictive quality of the models that result from the time period samples, a limit is placed on the maximum length of combined hourly time periods that are allowed over a campaign period. Among the possible choices of combinations of hourly time periods to form modeling time periods that create adequate model samples, one or more combinations will minimize the maximum length of modeling time periods over the campaign day so that, in other words, the longest modeling time period resulting from that method of doing combinations of hourly time periods will be at least as short as the longest time period of any other choice of hourly period combinations having an adequate model sample. The sample adequacy measure is:

$M(\text{sample}) = \lambda_{MAX}/\lambda$

An adequate subpopulation sample exists if the maximum allowable length $\lambda_{MAX}$ of modeling time periods divided by the length $\lambda$ of the minimum achievable longest time period is greater than or equal to one. If M(sample) is at least one then that subpopulation has an adequate sample for the modeling requirements associated with this particular embodiment; otherwise this subpopulation must be combined with another subpopulation.

For the single modeling time period minimum adequate sample value L in [0035], two versions are used, a first version that determines an adequate sample size to allow for both a model development sample and an independent model validation sample, and a second version for an adequate sample size for model development but without enough observations to allow for an independent validation sample. Where LV represents validation and LNV represents no validation per performance group limits:

LV≦minimum[m(1),m(2),m(3)]
LNV≦minimum[m(1),m(2),m(3)]
LNV<LV

All modeling time periods must satisfy the LNV constraint in [0041], however, the percentage of the total set of modeling periods that satisfy the LV constraint in [0040] is a selectable parameter.

If at step 26 a determination is made that the sample of a subpopulation is not adequate, the process continues to step 28 to combine the subpopulations having the inadequate sample with one of the other subpopulations at that level which are branches from the same node. Since splitting variables may have more than two splits, at step 28 a selection process is applied for combining subpopulations in a manner that provides desired model qualities. One constraint considered in the selection of subpopulation combinations is that each subpopulation remaining after combinations are complete must have an adequate modeling sample. Other examples of constraints that aid in selection of subpopulations to combine are that the remaining subpopulations have the largest number of replacement branches possible and that subpopulations selected for combination have as much similarity as possible. The definition of similarity between subpopulations depends on the type of model that is developed from the subpopulations. For continuous response variables, similarity is defined in term of the statistics of the response variable in the sample of a branch; for two branches B and B' form the same node define the dissimilarity between B and B' as $D(B,B')=[(Avg(B)-Avg(B'))^2+(Std(B)-Std(B'))^2]^{1/2}$ Avg(B) and Std(B) are the mean value and the standard deviation of the response variable on the sample for B. For binary response variables, similarity is defined in terms of the performance groups; for two branches B and B' from the same node define:

m1=number of observations in the B sample in Group 1
m1'=number of observations in the B' sample in Group 1
m2=number of observations in the B sample in Group 2
m2'=number of observations in the B' sample in Group 2
p1=m1/(m1+m2)
p2=m2/(m1+m2)
p1'=m1'/(m1'+m2')
p2'=m2'/(m1'+m2')

The dissimilarity of branches B and B' are defined by:
$D(B,B')=[(p1-p1')2+(p2-p2')2]^{1/2}$ The variable D has a value of zero for perfect similarity and increases to a maximum value of 21/2 as similarity decreases.

For models with an N-ary response variable, a generalization of the binary case for use with automated combination decisions gives:

m(i)=number of observations in the B sample in Group i, i=1,...,N
m'(i)=number of observations in the B' sample in Group i, i=1,...,N
p(i)=m(i)/[m(1)+...+m(N)], i=1,...,N
p'(i)=m'(i)/[m'(1)+...+m'(N)], i=1,...,N
$D(B,B')=[\{p(1)-p'(1)\}^2+...+\{p(N)-p'(N)-\}^2]^{1/2}$ For the embodiment with K hourly time periods of a campaign day, the dissimilarity measure D(B,B') is defined for each hour and then summed to get a total dissimilarity. Notationally, where N=3, this is defined as:

m(i,j)=# of observations in the B sample in Group i, hour j, i=1,...,N,j=1,...,K
m'(i,j)=# of observations in the B' sample in Group i, hour j, i=1,...N,j=1,...,K
p(i,j)=m(i,j)/[m(1,j)+...+m(N,j)], i=1,...,N, j=1,...,K
p'(i,j)=m'(i,j)/[m'(1,j)+...+m'(N,j)], i=1,...,N,j=1,...,K
$Dj(B,B')=[\{p(\mathbf{1},j)-p'(1,j)\}^2+...+\{p(N,j)-p'(N,j)\}^2]^{1/2}$, j=1,...,K
$D(B,B')=[D1(B,B')^2+...+DK(B,B')^2]^{1/2}$ At step 28 of FIG. 2, selection of which branch to combine where more than two branches from a single node exist is optimized by seeking to obtain the largest number of replacement branches as possible, i.e., the largest number of subpopulations remaining at after the combination while meeting the constraint that each remaining subpopulation has an adequate sample to support generation of a model that is valid. Where various combinations of subpopulations result in the maximum attainable number of replacement branches, an additional factor to consider is selection of subpopulations that have greater similarity, since more homogeneous subpopulations tend to provide models having a closer fit and more repeatable performance on independent samples. A recursive approach provides automated selection of subpopulations for combination where subpopulations having an adequate sample are not combined with each other and combinations occur only where at least one subpopulation lacks an adequate sample. Number the original branches from a single node 1,...,α. For a permutation (reordering) $i_1,...,i$ of 1,...,α, the following pseudo-code illustrates a method of automatically computing subpopulation combinations, based on this permutation, to obtain an adequate sample for each member of the reduced set of subpopulations:

```
All_Adequate = FALSE;
Num_branches = •;
Do while .not. All_Adequate;
    Do for J = 1,...,Num_branches;
        If the sample for i_J is not adequate then do;
            Find the branch, other than branch i_J, which is the most
            similar to branch i_J, and combine it with branch i_J. If there
            is more than one which is most similar, choose the one with
            the lowest sample adequacy measure. Now the number of
            branches has been reduced by one, with branch i_J now deleted.
        End if;
    End do;
    If all the branches in the reduced set have an adequate sample
    Then do:
        All_Adequate = TRUE;
    Else do;
        Reset the value of Num_branches to correspond to the revised
        number of branches and keep this reduced set of branches in the
        same order as in the original permutation;
        Update the values of the indices to also correspond to the
        revised set of branches;
    End do;
End do while;
```

The computation is executed for each permutation so that each execution produces a set of revised subpopulations that meets the adequate sample criterion while maximizing similarity in each pair-wise combination of subpopulations. Out of the totality of these sets of revised subpopulations, the one with the largest number of subpopulations is selected. If more than one set of subpopulations has the largest number, the set is selected that has the best overall performance for similarity. To accomplish this, for each maximal revised set starting with the permutation that generated the set, the original construction process is walked through to compute dissimilarity for each pair of subpopulations that are combined during the recursion, and then the dissimilarity values are summed so that the set with the lowest dissimilarity is selected. This approach may result in a selection of combinations that does not actually produce the true maximum number of subpopulations; however, the solution offers a balance between maximizing the number of subpopulations and combining similar subpopulations.

When there are a relatively large number of branches from the same node, speed improvement can be made by keeping track of the largest size of revised branch sets for permutations completed at a given point in the search through the total set of permutations, and whenever the combining process for a new permutation reaches a point where the revised set has fewer branches than the current largest size, that permutation can be dropped without computing its final revised set. Another method of speed improvement uses a Monte Carlo approach. The space of all permutations of $(1, \ldots, \alpha)$ has $\alpha! = 1 \cdot 2 \ldots \alpha$ members. For example, if $\alpha = 10$ then $\alpha! = 3,628,800$. Instead of doing an exhaustive search through this space of permutations, a representative random sample is used. The following procedure efficiently creates this sample. Use a random number generator to obtain $\alpha$ independent random numbers $r_1, \ldots r$, uniformly distributed in the interval $[0,1]$. Form the set of order pairs $\{(1, r_1), \ldots, (\alpha, r)\}$, and sort this set in non-decreasing order of the second elements of the ordered pairs. This ordering produces a random permutation of $(1, \ldots, \alpha)$ by lining up the first elements of the ordered pairs in the sorted order. This process is repeated $\gamma$ times where $\gamma < \alpha!$. Experimentation is used to determine which value of $\gamma/\alpha!$ consistently produces acceptable results. If $\alpha \leq 8 (8! = 40,320)$ then using a random sample is not necessary.

Once the subpopulations are recombined at step 28, the process continues to step 32 to determine if additional variables are available to split. If additional variables are available to split, the process returns to step 24 to the split on the next variable in the splitting order. If not, the process continues to step 34 to generate models and apply the models to management of the desired task.

Figure 3:
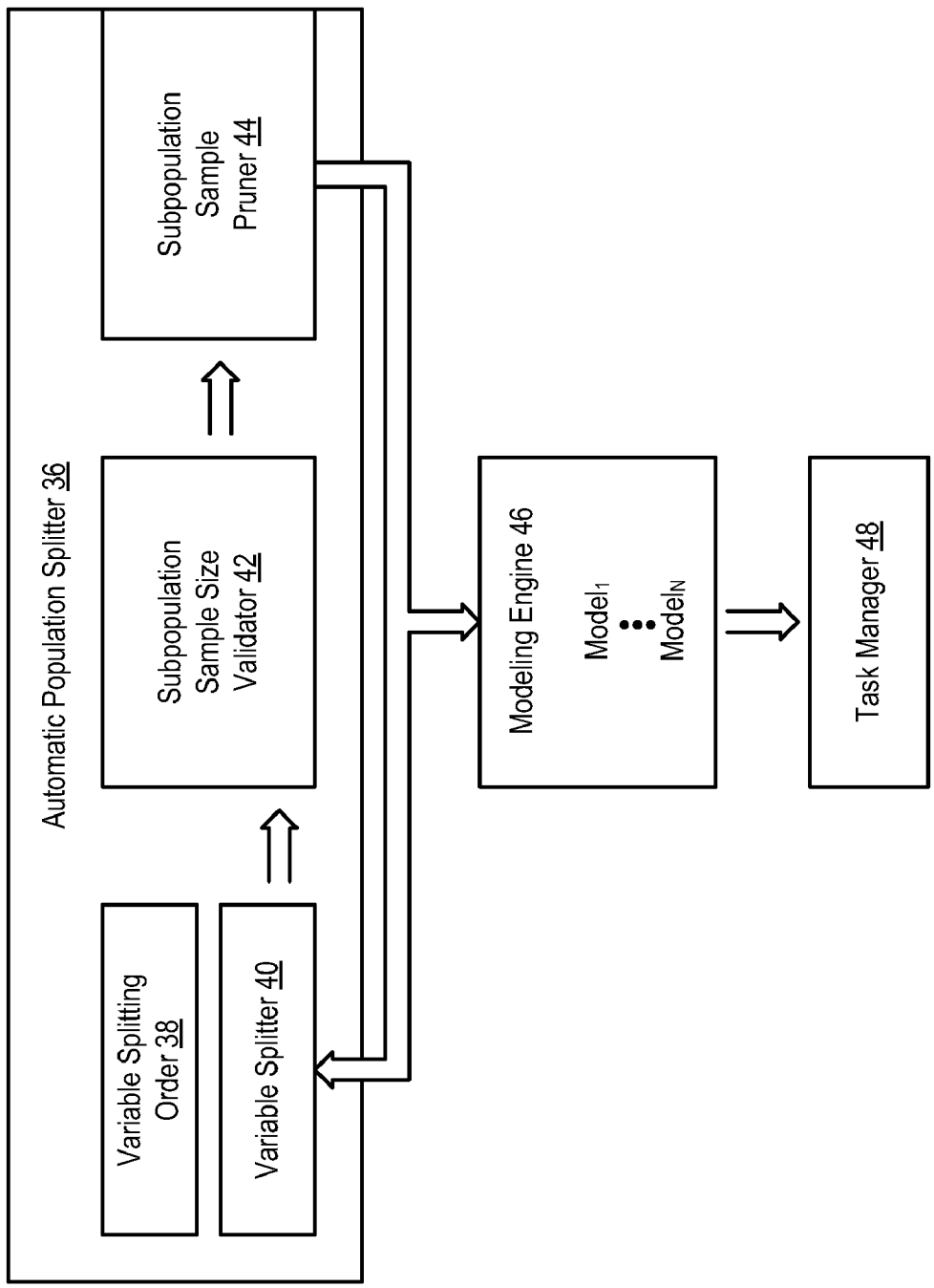
FIG. 3 depicts a block diagram of a system for automated population splitting to generate models for managing tasks with analytics.

Referring now to FIG. 3, a block diagram depicts a system for automated population splitting to generate models for managing tasks with analytics. Automated population splitter 36 runs on a computer system to automatically split variables of a sample population to enhance predictive models generated from the sample population for managing a task. A variable splitting order 38 defines the variables of the population to be split on and the order in which the variables are used for splitting. A variable splitter 40 applies the variable at a given level in the splitting order to define the subpopulations at that level. A subpopulation sample validator 42 validates that each subpopulation produced by variable splitter 40 provides a sample adequate to generate a valid model and identifies inadequate samples. A subpopulation sample pruner 44 selectively combines inadequate subpopulation samples with the samples of other subpopulations from the same node, so that each of the subpopulations remaining after the combinations has a sample adequate to support a valid model. The process identified in 40, 42 and 44 goes through all the splitting levels and produces the final subpopulations. These subpopulations are then provided to a modeling engine 46 which generates one or more models for each subpopulation. The models predict outcomes associated with a task under management, such as outbound calling, e-mailing, conventional mailing, instant messaging or other tasks in which predictive modeling provides enhanced management. A task manager 48 applies the models to manage tasks by predicting outcomes and altering management decisions based on the predicted outcomes.

Figure 4:
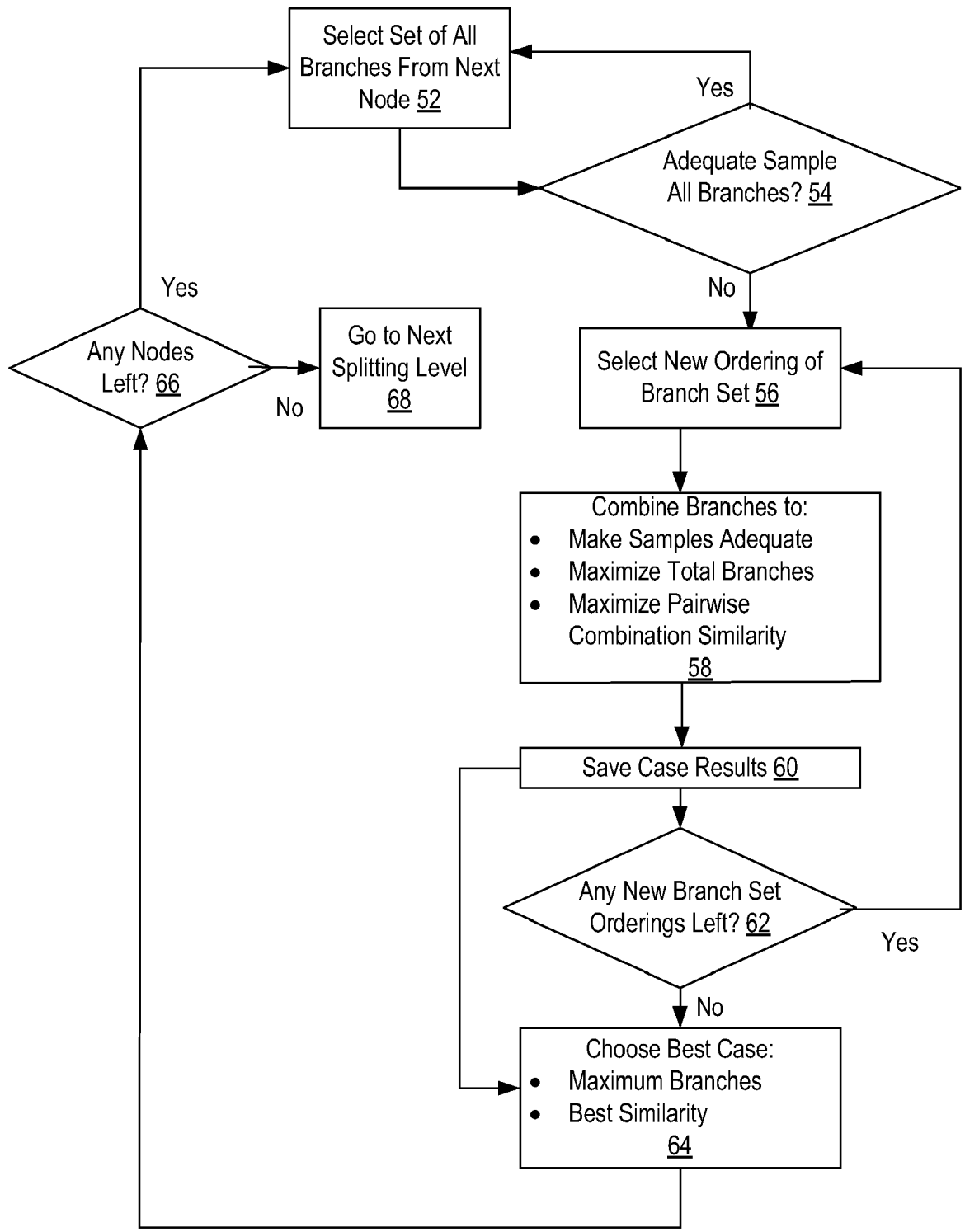
FIG. 4 depicts a flow diagram of a process for selecting subpopulations to combine if a subpopulation is not adequate to support a model.

Referring now to FIG. 4, a flow diagram summarizes the process described above in [0068] through [0072] for selecting subpopulations to combine if a subpopulation is not adequate to support a model. The flow starts in 52, after all the initial branches have been created for the current level by apply the current splitting variable to all the nodes of the previous level. Only branches that were split out from the same node in the previous level can be recombined in the pruning process. In 52 one of the nodes from the previous level is chosen, and all the branches that were split off from that node are identified. In 54 all those branches are tested to see if they have adequate samples. If all samples are adequate then the process reverts to 52 and chooses another node and its set of branches (if no more nodes are left then the pruning process on this level terminated, splitting is performed for the next level, and the process starts again in 52 for the next level). If there are one or more samples that are inadequate then the pruning process begins in 56 by chosen a permutation (ordering) of the branches. That ordering is used in 58 as part of defining how the branches will be combined. The definition of that revised set of branches for the chosen node is then stored for later use in 60. Then in 62 it is determined if any other ordering of the branches remain. If so then another ordering is selected and processed, and this continues until all possible ordering have been used. Then the results of all these cases are compared in 64 and the final choice of which revised set of branches to use is made for that node. Next the process checks to see if there are any nodes from the previous level left which have not been dealt with. If there are then another node is selected and control passes back to 52. If all the nodes have been handled then the process drops to the next level in 68 and starts again at 52, or if there are no more levels then the splitting/pruning process is complete. To illustrate optimized selection of subpopulations for combination, an example is presented for based on an outbound calling campaign day broken into sixteen hourly time periods. The node and its branches identified in 52 contain the results of calls placed throughout the campaign day and gathered over some number of days. The splitting variables used, such as those in Table 1, do not differentiate in which of the 16 hourly periods a call was placed. selection of hourly time period subpopulations. The hourly time periods are used in 54, as part of defining an adequate sample. The objective of model development for this example is to be able to predict call outcome (right party contact, wrong party contact, or non-contact) for each account at different times during the day. The sample for each branch considered in 54 is split into hourly time period sub-samples, and the criterion identified in [0036] through [0043] is used to determine if the subpopulation sample is adequate. It must be determined if there is at least one way of combining contiguous hourly time period sub-samples for a given branch to obtain longer modeling time periods which each meet the single model criterion [0029] and so that all those modeling time periods satisfy the length requirement [0038].

When one or more of the branches from the chosen node has an inadequate sample then the sub-process identified in 56 through 64 is invoked. The same adequate sample criterion just described comes into play in 58 in evaluating combinations, and the dissimilarity measure [0067] is used in 64 to break ties for the best choice of how branches are combined. The overall process defined in FIG. 4 proceeds through the final level and the final subpopulations are defined. The best choice of recombining branches in 64 for each node, after the final split is complete, is used to identify the modeling time periods to use for each final branch for model development.

In practice, optimizing hourly time period combinations presents a computationally intensive task. For example, if a campaign day is broken into 16 hourly interval subpopulations, the total number of ways to form combined modeling time periods is $2^{15}$=32,768. For a given set of modeling time periods:

$\mu(P)$=length (in hours) of the longest time period of P the modeling time period formation optimization objective is to find a choice of combinations having a minimum length in which each subpopulation provides an adequate size to allow for a model development sample, at least a predetermined fraction of subpopulations provide an independent validation sample, and each subpopulation has a length of less than the maximum allowed length:

$\lambda_{MAX} < \min[\mu(P)]$ means the sample is not adequate
where $\lambda_{MAX}$ is defined in [0038], and
$\lambda_{MAX} \geq \min[\mu(P)]$ means the sample is adequate A first iterative loop is performed through the set of all possible time periods to determine the smallest value of a time period that provides an adequate sample. A second iterative loop is performed to collect the set of time periods that provide an adequate sample and have the smallest value found in the first loop. From among the set of time periods identified in the second loop, one set will exist in which the total number of time periods that provide an adequate sample is maximized, thus providing an optimized selection of the available time period combinations. Where more than one set of time periods provides an optimized selection, the set of combination is selected that has the least value for dissimilarity so that the set chosen has combinations with the greatest similarity.

Figure 5:
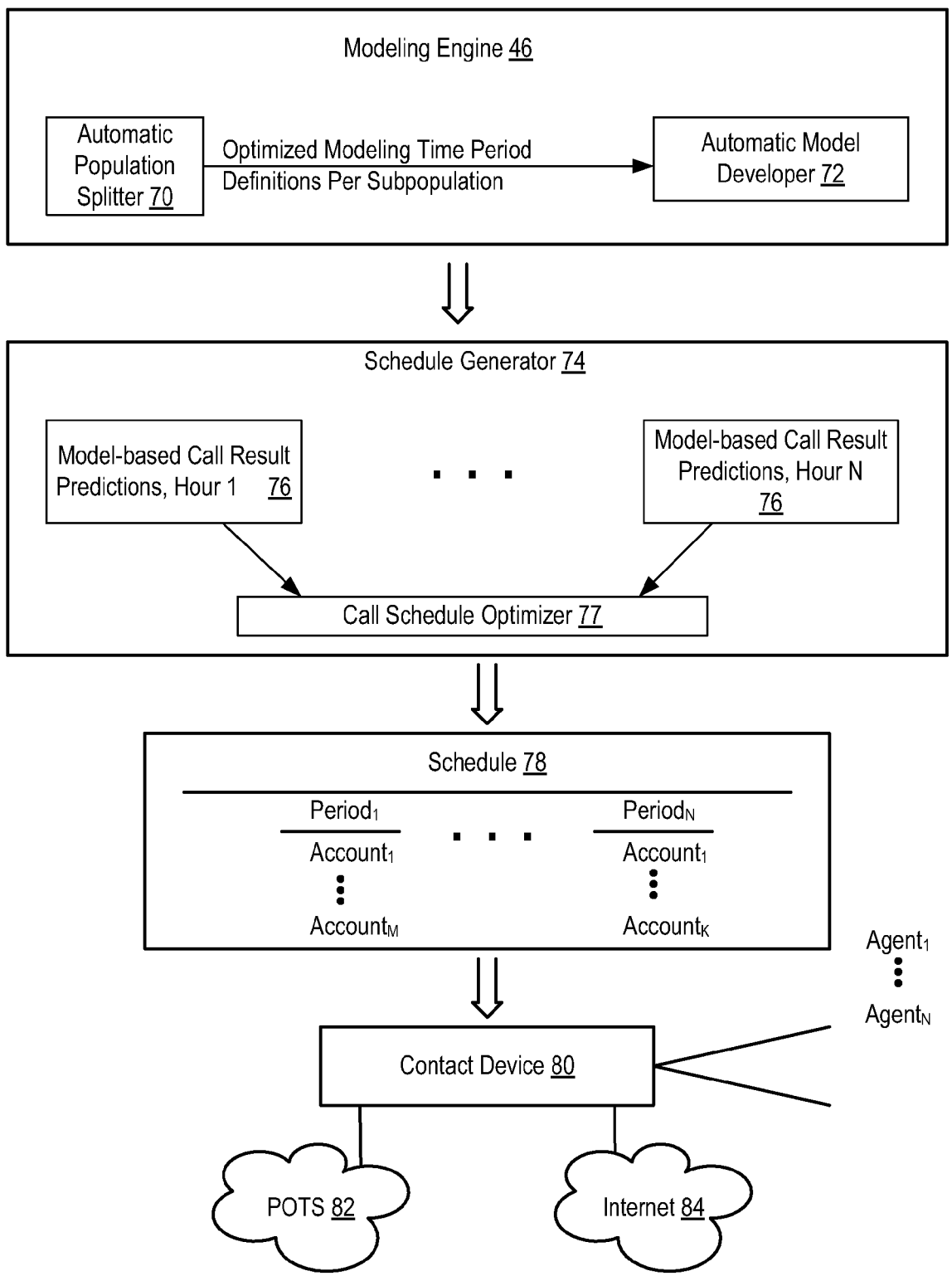
FIG. 5 depicts a block diagram of a system for management of outbound contacts with models generated by subpopulation time periods.

Referring now to FIG. 5, a block diagram depicts a system for management of outbound contacts with models generated by subpopulation time periods. Modeling engine 46 performs automated population splitting 70 and generates models 72 that can predict outbound contact results for accounts for the current day based on account information. Historical contact attempt results provide the basis for model development. These models are developed for each terminal subpopulation defined by the automatic population splitter 70, based on the modeling time periods uniquely defined for each terminal subpopulation. Once the terminal subpopulations are defined, the unique modeling time periods per terminal population are defined, and a model is developed for each modeling time period of each terminal subpopulation, calls can be scheduled for each day's account set. The models are used in 76 to create call results prediction per hourly time period for each account. The terminal subpopulation to which a given account belongs is determined and then the models for that subpopulation are used for its hourly predictions, with the same model being used for all the hourly time periods within its modeling time period. The predicted hourly call outcomes and the call resources available within each hourly time period are then provided to the call schedule optimizer 77, which creates the lists of accounts to be called during each hour of the day. This schedule 78 is provided to a contact device 80 which performs contact attempts, such as telephone calls, e-mails, instant messages, mail, etc. . . . , through POTS 82 or Internet 84 to place agents in communication with contacted individuals. By performing contact attempts according to schedule 78, contact device 80 resources are better utilized.

In addition to performing population segmentation for general modeling and the more specific use of segmentation for modeling outbound calling, the automatic population splitter (auto-splitter) invention also helps to define business strategies and aid other tasks associated with analytics. For example, banks and financial institutions that currently use labor-intensive error prone manual processes for defining business decision trees can use the auto-splitting process set forth above to substantially improve the efficiency of construction and the usefulness of business decision trees. For instance, auto-splitting helps to formulate a decision of whether to increase, decrease, or leave unchanged a credit limit currently assigned to a credit card account, and to determine the amount of the change if the increase or decrease option is chosen. The auto-splitting decision process divides up the account population into several distinct categories and associates a certain treatment of the type mentioned with each category.

As a more specific example, a typical manual process might work as follows: (1) Select a sample from the total targeted population; (2) Choose a splitting variable, manually select the splitting breaks to be used for that variable, and perform the defined splits on the sample to define a subsample corresponding to the subpopulations; (3) Choose a new splitting variable and manually selected breaks, and use them to split each sub-sample; and (4) Repeat (3) until all desired splitting variables have been used. This approach fails to prune or recombine sub-samples on the same level to obtain adequate sample sizes, and selects splitting breaks based on guesswork that typically results in a lack of balance in the size of the sub-samples created. The overall result is often a set of terminal nodes with significant disparities in numbers of observations, with some heavily populated and others having few or no observations. Manual attempts at recombining sub-samples might be made to correct this, but are ineffective and inadequate to correct the problem back through the splitting levels. The auto-splitter method described herein solves these problems, using a performance variable that is either binary or continuous. Automatic selection of the breaks for each splitting variable can be used to provide a more even-handed use of the variables, in addition to applying the optimal pruning technique mentioned previously. This replaces a laborious ineffective manual process with a reliable automated method which produces an optimized set of decision tree terminal nodes.

Once a candidate set of terminal nodes are defined, the user assigns the treatments to be applied to each of these nodes. Models developed on the terminal subpopulations produced by the auto-splitter or by other means are employed in simulation to predict the effectiveness of the proposed treatment decision process (combination of terminal nodes and assigned treatments). Simulation results for the currently used decision process are compared to the simulation results for the proposed new process (champion-challenger). The decision may then be made to deploy the new process, refine the treatment definitions, or generate a new set of terminal nodes, based on modifying the splitting variable choices, and assign treatments again. This recursive process of terminal nodes generation, treatment assignment, and simulation continues until the user is satisfied with the predicted results and deploys the new decision process.

As an example, for the credit line adjustment mentioned above the performance variable used by the auto-splitter is the account profit over some time window. The models needed for simulation provide a method for predicting the change in profit based on a given change in credit line. This estimated profit change would be computed for each account in a simulation sample, for both the currently deployed decision process and candidate new process. Let $\Delta pc$ and $\Delta pn$ denote the estimated profit change for an account based on using the current process and the proposed new process respectively. Each of $\Delta pc$ and $\Delta pn$ is summed for all the accounts in each terminal node of the new process. This determines how much the new process improves profit at the local level. In addition each of $\Delta pc$ and $\Delta pn$ is summed for all the accounts in the entire simulation sample, to determine the total profit improvement and to allow computation of the average profit increase.

Although the present invention has been described in detail, it should be understood that various changes, substitutions and alterations can be made hereto without departing from the spirit and scope of the invention as defined by the appended claims.

What is claimed is:

1. A method for placing outbound calls to accounts during a campaign period, each account having account information, the method comprising:
   dividing the campaign into plural time periods;
   dividing a sample population of accounts having call results into the plural subpopulations based upon a characteristic of a variable of the sample population;
   analyzing the subpopulations to identify at least one subpopulation having an inadequate sample size;
   selectively combining the identified subpopulation with one or more of the other subpopulations;
   generating a model for each subpopulation remaining after the selectively combining, the model predicting call results for outbound calls;
   applying the account information to the models with a computer system to predict outbound call results for the accounts during the plural time periods; and
   placing outbound calls with a telephone dialer to the accounts based at least in part on the predicted outbound call results;
   wherein selectively combining the identified subpopulation further comprises combining only the subpopulations having consecutive time periods and optimizing the combining of the subpopulations to minimize the maximum length of the time periods associated with the combined subpopulations.

2. The method of claim 1 further comprising:
   determining that combining the identified subpopulation with a first or a second subpopulation provides the minimized maximum length of the time periods;
   evaluating the first and second subpopulations for similarity with the identified subpopulation; and
   selecting the first or second subpopulation to combine with the identified subpopulation that has the greatest similarity with the identified subpopulation.

* * * * *